United States Patent
Ohkubo et al.

(10) Patent No.: US 7,416,595 B2
(45) Date of Patent: Aug. 26, 2008

(54) INK-JET INK AND INK-JET RECORDING METHOD

(75) Inventors: Kenichi Ohkubo, Tokyo (JP); Hisato Kato, Tokyo (JP); Makoto Kaga, Tokyo (JP); Yoshinori Tsubaki, Tokyo (JP); Kumiko Furuno, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/670,022

(22) Filed: Feb. 1, 2007

(65) Prior Publication Data

US 2007/0182796 A1    Aug. 9, 2007

(30) Foreign Application Priority Data

Feb. 8, 2006   (JP) .............................. 2006-030834

(51) Int. Cl.
*C09D 11/02*   (2006.01)
*B41J 2/01*    (2006.01)

(52) U.S. Cl. .............. 106/31.78; 106/31.86; 106/31.89; 347/100

(58) Field of Classification Search .............. 106/31.78, 106/31.86, 31.89; 347/100
See application file for complete search history.

(56) References Cited

U.S. PATENT DOCUMENTS

| | | | | | |
|---|---|---|---|---|---|
| 4,365,998 | A | * | 12/1982 | Sugiyama et al. | 106/31.49 |
| 4,840,674 | A | * | 6/1989  | Schwarz         | 106/31.43 |
| 5,223,026 | A | * | 6/1993  | Schwarz, Jr.    | 106/31.43 |
| 5,580,373 | A | * | 12/1996 | Lane et al.     | 524/100   |
| 5,852,075 | A | * | 12/1998 | Held            | 523/161   |
| 6,045,606 | A | * | 4/2000  | Matzinger       | 106/31.27 |
| 6,231,654 | B1| * | 5/2001  | Elwakil         | 106/31.47 |
| 6,328,393 | B1| * | 12/2001 | Lin et al.      | 347/1     |
| 6,478,862 | B1| * | 11/2002 | Elwakil         | 106/31.6  |
| 2003/0079644 | A1 | * | 5/2003  | Smith et al.  | 106/31.29 |
| 2004/0266907 | A1 | * | 12/2004 | Sugita et al. | 523/160   |
| 2007/0040880 | A1 | * | 2/2007  | Jackson et al.| 347/100   |

* cited by examiner

*Primary Examiner*—Helene Klemanski
(74) *Attorney, Agent, or Firm*—Lucas & Mercanti, LLP

(57) ABSTRACT

An ink-jet ink comprising Component (A), Component (B), and Component (C), wherein a content of Component (A) is 20-60% by weight, a content of Component (B) is 10-50% by weight, and when the content of Component (A) is 100% by weight, the total content ratio of a class of glycol, a class of polyol, and glycerin is 0-20% by weight, and a surface tension of the ink-jet ink is 18-27 mN/m; wherein Component (A) is 1,3-dimethyl-2-imidazolidinone or γ-butyrolactone, Component (B) is water, and Component (C) is a pigment.

13 Claims, No Drawings

INK-JET INK AND INK-JET RECORDING METHOD

This application is based on Japanese Patent Application No. 2006-030834 filed on Feb. 8, 2006, in Japanese Patent Office, the entire content of which is hereby incorporated by reference.

TECHNICAL FIELD

The present invention relates to a novel ink-jet ink and an ink-jet recording method.

BACKGROUND OF THE INVENTION

In recent years, since ink-jet recording systems are capable of easily forming images at low cost, they have been applied to various printing fields such as photography, various types of printing, and special printing such as marking or color filters.

Ink-jet inks employed in such ink-jet recording systems include a plurality of inks such as an aqueous ink employing water as a main solvent, an oil ink employing non-volatile solvents as a main solvent, a solvent ink employing volatile solvents as a main solvent, a hot-melt ink enabling printing via thermally melting an ink which is solid at room temperature, or an actinic radiation curable ink which is cured by exposure to actinic radiation such as light after printing, and each of the above inks is appropriately employed in response to its use.

On the other hand, recording media prepared via employing polyvinyl chloride are widely employed to prepare various products such as outdoor bulletin boards which are required to be weather resistant over a long period of time, or printed matter which is required for close contact with a curved surface. There is a plurality of methods to achieve printing onto soft polyvinyl chloride. Of these, an ink-jet recording method is available which does not require plate preparation, shortens the time for a finished print, and is suitable for production of small quantities, but of many types.

When ink-jet recording is applied to soft polyvinyl chloride, a solvent ink, incorporating a major amount of cyclohexanone, has been employed as an ink-jet ink. For example, a cyclohexanone incorporating ink is disclosed (refer to Patent Document 1). Cyclohexanone results in high dissolving capability to soft polyvinyl chloride and pigments in an ink-jet ink enter into soft polyvinyl chloride, resulting in desired abrasion resistance and glossiness. However, cyclohexanone is specified as the Second Class Organic Solvent in Japan, and not only results in concerns of safety but also results in a problem in which during handling of an ink-jet ink incorporating cyclohexanone, a localized exhaust system is required.

Contrary to this, solvent inks which do not feature incorporation of cyclohexanone have been developed and marketed. Instead of cyclohexanone as a solvent to dissolve polyvinyl chloride with the inherent problems as above, solvent inks which incorporate solvents such as amide are disclosed (refer to Patent Documents 2 and 3). Even though such ink-jet inks are employed, it is not possible to completely eliminate unpleasant odor during printing since the major ink component is composed of organic solvents. In addition, it is hard to state that the present ink-jet ink provides sufficient characteristics such as personal safety, no unpleasant odor, and appropriateness when printed onto polyvinyl chloride. Further, the solvent inks, disclosed in above Patent Documents 2 and 3, are appropriate to some extent aptitude to record onto polyvinyl chloride, but when printed onto media employing paper as a substrate, problems result in which colorants easily bleed through to the reverse side and density is insufficient.

(Patent Document 1) Japanese Translation of PCT International Application Publication No. 2002-526631

(Patent Document 2) Unexamined Japanese Patent Application Publication No. (hereinafter, referred to as JP-A) 2005-15672

(Patent Document 3) JP A 2005-60716

SUMMARY OF THE INVENTION

In view of the foregoing, the present invention was attained. An object of the present invention is to provide an ink-jet ink which exhibits excellent printing capability (such as quick drying) for polyvinyl chloride, excellent abrasion resistance, and secured personal safety, results in no unpleasant odor, and exhibits excellent rear surface penetration (or bleed-through) resistance when printed onto a paper substrate recording medium, and an ink-jet recording method using the same.

The above object of the present invention is achieved employing the following embodiments.

Item 1. An ink-jet ink comprising Component (A), Component (B), and Component (C), wherein a content of Component (A) is 20-60% by weight, a content of Component (B) is 10-50% by weight, and the total content ratio of glycols, polyols, and glycerin is 0-20% by weight based on the content of Component (A), and a surface tension of the ink-jet ink is 18-27 mN/m;

Component (A): 1,3-dimethyl-2-imidazolidinone or γ-butyrolactone,

Component (B): water, and

Component (C): a pigment.

Item 2 The ink-jet ink of Item 1 above, further comprising a surface active agent.

Item 3. The ink-jet ink of Item 1 or 2 above, wherein the surface active agent is a fluorine based surface active agent or a silicone based surface active agent.

Item 4. The ink-jet ink of any one of items 1-3 above, wherein the total content ratio of glycols, polyols, and glycerin is 0-10% by weight based on the content of Component (A).

Item 5. The ink-jet ink of any one of Items 1-4 above, wherein the ink-jet ink does not contain glycols and polyols, and glycerin.

Item 6. The ink-jet ink of any one of Items 1-5 above, wherein the content of Component (A) is 20-40% by weight based on the total weight of the ink.

Item 7. The ink-jet ink of any one of Items 1-6 above, wherein Component (A) is 1,3-dimethyl-imidazolidinone.

Item 8. The ink-jet ink of any one of Items 1-7 above, wherein at least one solvent selected from the group consisting of the class of alkylene glycol monoalkyl ether, the class of alkylene glycol dialkyl ether, the class of alkylene glycol acetate, the class of alkylene glycol diacetate, and the class of alkylene glycol monoalkyl ether acetate.

Item 9. The ink-jet ink of any one of Item 8, incorporating at least one solvent having a boiling point of 180-250° C. and a surface tension of 20-30 mN/m, selected from the group consisting of alkylene glycol monoalkyl ethers, alkylene glycol dialkyl ethers, alkylene glycol acetates, alkylene glycol diacetates, and alkylene glycol monoalkyl ether acetates.

Item 10. A method for ink-jet recording comprising the step of:
i) recording an image employing the ink-jet ink of any one of Items 1-9 above onto polyvinyl chloride as a recording medium.

Item 11. A method for ink-jet recording comprising the step of:
i) recording an image employing the ink-jet ink of any one of Items 1-9 above onto a paper substrate recording medium.

Item 12. A method for ink-jet recording comprising the step of:
i) recording an image employing the ink-jet ink of any one of Items 1-9 above onto a recording medium a surface temperature of which is controlled with a heater provided with a recording apparatus.

Item 13. The method for ink-jet recording of Item 12, wherein a recording medium the surface temperature of which is controlled with a heater provided with a recording apparatus is polyvinyl chloride.

DETAILED DESCRIPTION OF THE INVENTION

Based on the present invention, it has become possible to provide an ink-jet ink which exhibits excellent printing capability (quick drying) for polyvinyl chloride, excellent abrasion resistance, and secured personal safety, results in no unpleasant odor, and exhibits excellent bleed-through resistance when printed onto paper substrate recording media, and an ink-jet recording method using the same.

Optimal embodiments to realize the present invention will now be detailed.

In view of the foregoing, the inventors of the present invention conducted diligent investigations. As a result, the following was discovered and the present invention was attained. An ink-jet ink (hereinafter also referred simply to as an ink) incorporating Component (A) which is 1,3-dimethyl-2-imidazolidinone or γ-butyrolactone, Component (B) which is water, and Component (C) which is a pigment, wherein the content of aforesaid Component (A) was 20-60% by weight, the content of aforesaid Component (B) was 10-50% by weight; the total content ratio of the class of glycol (also referred to as glycols), the class of polyol (also referred to as polyols), and glycerin was 0-20% by weight based on the content of Component (A); and the surface tension was 18-27 mN/m, exhibited excellent printing capability (quick drying) on polyvinyl chloride, excellent abrasion resistance, and secured personal safety, resulted in no problem of unpleasant odor, and exhibited excellent rear surface penetration (or bleed-through) resistance when printed onto recording paper substrate media.

Conventionally, aqueous ink-jet inks, incorporating water as a major component, have been employed for consumer ink-jet printers for various applications due to negligible generation of unpleasant odor and safety. However, when printing is carried out on a polyvinyl chloride recording medium, employing the aqueous ink-jet ink known in the art, critical drawbacks occur in which the ink-jet ink is repelled from the surface of polyvinyl chloride, and the drying rate of the ink on polyvinyl chloride is low, whereby it has been considered that it is difficult to apply aqueous ink-jet inks to polyvinyl chloride. The inventors of the present invention conducted investigation of ink formulae while paying attention to the fact that 1,3-dimethyl-2-imidazolidinone or γ-butyrolactone readily swells polyvinyl chloride resins, and glycols, polyols, and glycerin hardly swell the same, as well as the relationship between the surface tension of the ink and the wettability on the surface of polyvinyl chloride, and the difference in an ink drying rate due to the water content in the ink. As a result, the above drawbacks were overcome, whereby it was possible to prepare an aqueous ink-jet ink which was applicable to polyvinyl chloride, and the present invention was completed.

Namely, the inventors of the present invention conducted investigation of wettability characteristics of an aqueous ink for polyvinyl chloride. As a result, it was discovered that it was necessary to further lower the surface tension of the present ink compared to solvent inks. Since water is incorporated as a solvent which exhibits a high hydrogen bonding capability, it is assumed that mutual interaction among solvents is stronger than that between the surface of polyvinyl chloride and the solvent. Based on the above finding, by controlling the surface tension of ink within 18-27 mN/m, it was possible to form images without ink repellence, even when printing is carried out on polyvinyl chloride employing a water containing ink. Further, it was discovered that by incorporating 1,3-dimethyl-2-imidazolidinone or γ-butyrolactone in the ink in at least the specified amount and by controlling the content ratio of glycols, polyols, and glycerin to at most the specified value, excellent drying also resulted after printing on polyvinyl chloride. Assumed factors, which enhance drying properties by employing the ink composition specified by the present invention, include, but are not limited to, those described below. Firstly, the inventors of the present invention investigated swelling of polyvinyl chloride in various solvents. As a result, it was discovered that 1,3-dimethyl-2-imidazolidinone or γ-butyrolactone, which was Component (A) according to the present invention, exhibited desired personal safety and excellent swellability of polyvinyl chloride, while glycols, polyols, and glycerin (hereinafter also referred to as a humectant) hardly swelled polyvinyl chloride. Based on the above finding, by setting the content of Component (A) at equal to or more than the specified value and the content ratio of the humectants with respect to Component (A) at equal to or less than the specified ratio in the ink, the ink tends to swell polyvinyl chloride. Further, it is assumed that while printing employing the ink, in response to evaporation of water, Component (A) is concentrated, whereby swellability of polyvinyl chloride is further enhanced. Based on such mechanism, it is assumed that the ink of the present invention significantly swells polyvinyl chloride to result in penetration of the ink from the surface to the interior of the polyvinyl chloride, whereby quick drying is realized.

Further, the ink of the present invention also exhibits advantages such as excellent recording capability for paper substrate recording media, minimal rear surface penetration (or bleed-through) of colorants to the other surface, compared to the solvent ink which has been employed for recording on polyvinyl chloride, or higher surface density. Assumed factors include, but are not limited to, these described below. Namely, the ink of the present invention incorporates water and due to the above, it is assumed that wettability of ink on cellulose fiber constituting a paper substrate is lowered, compared to solvent inks. Subsequently, it is assumed that the penetration rate of ink is lowered to increase tendency of colorant adsorption onto cellulose fiber, whereby bleed-through is retarded.

The constitution of the ink-jet ink of the present invention will now be specifically described.

The ink of the present invention is characterized by incorporating, as Component (A), 1,3-dimethyl-2-imidazolidinone or γ-butyrolactone in an amount of 20-60% by weight. Component (A) compounds may be employed individually or in combinations of two types. In Component (A) compounds, 1,3-dimethyl-2-imidazolidinone is more preferred in view of quick drying enhancement effect and enabled recording onto various brands of polyvinyl chloride recording media.

The content of Component (A) in the ink-jet ink of the present invention is commonly 20-60% by weight, but is preferably 20-40% by weight. When the content of Component (A) in the ink is at least 20% by weight, targeted drying properties are assured during printing on polyvinyl chloride, while when it is at most 60% by weight, sufficient strength of polyvinyl chloride can be maintained in the image portion at relatively large ink deposition amounts.

Examples of preferred solvents which may be employed together with Component (A) compounds according to the present invention include alkylene glycol monoalkyl ethers such as diethylene glycol monoethyl ether, triethylene glycol monomethyl ether, dipropylene glycol monomethyl ether, or tripropylene glycol monomethyl ether; alkylene glycol dialkyl ethers such as ethylene glycol dibutyl ether, diethylene glycol dimethyl ether, diethylene glycol diethyl ether, dipropylene glycol diethyl ether, or tetraethylene glycol dimethyl ether; alkylene glycol acetates such as diethylene glycol acetate; alkylene glycol diacetates such as ethylene glycol diacetate or propylene glycol diacetate, and alkylene glycol monoalkyl ether acetates such as ethylene glycol monobutyl ether acetate or propylene glycol monomethyl ether acetate. Compared to glycols, polyols, and glycerin, these solvents exhibit characteristics which swell polyvinyl chloride, and even when incorporated in ink, they rarely result in adverse effects of drying properties. Of the above solvents, it is preferable to employ those which exhibit a boiling point of 180-250° C., and a surface tension 20-30 mN. By employing solvents at a boiling point of at least 180° C., ejection properties of ink tend to be improved, while by employing solvents at a boiling point of less than 250° C., drying properties tend to be improved when printed on polyvinyl chloride. Further, by employing solvents of a surface tension of 20-30 mN/m, glossiness of images recorded on polyvinyl chloride tends to be improved. Specific examples of such solvents include ethylene glycol monobutyl ether acetate, ethylene glycol diacetate, diethylene glycol diethyl ether, diethylene glycol monobutyl ether acetate, triethylene glycol dimethyl ether, propylene glycol diacetate, dipropylene glycol monomethyl ether, and dipropylene glycol monomethyl ether acetate.

On the other hand, glycols such as ethylene glycol, diethylene glycol, or propylene glycol, polyols such as 1,2-hexanediol, 1,3butanediol, 2-ethyl-1,3-hexanediol, or 2,2,2-trimethyl-1,3-pentanediol, and glycerin are solvents which tend to degrade drying properties of ink when printed on polyvinyl chloride. The content of these solvents based on the weight of Component (A) is commonly 0-20% by weight, preferably 0-10% by weight, but is more preferably 0% by weight. These solvents exhibit moisture retention properties. Accordingly, it is assumed that they lower the drying rate of water on recording media and simultaneously retard penetration of ink onto the interior of polyvinyl chloride due to poor swelling capability of polyvinyl chloride, whereby quick drying is not achievable.

The ink-jet ink of the present invention is characterized in incorporating water as Component (B). The content of Component (B) is commonly 10-50% by weight, but is preferably 20-40% by weight. When the content of water is less than 10% by weight, it is not possible to sufficiently minimize unpleasant odor of the ink. Further, when printed on recording paper substrate media, colorants exhibit relatively strong bleed-through. When the content of water exceeds 50% by weight, the resulting drying rate is lowered in the course of printing on polyvinyl chloride.

The surface tension of the inkjet ink of the present invention is commonly 18-27 mN/rn, but is preferably 20-25 mN/rn. When the surface tension exceeds 27 mN/rn, wettability of ink on polyvinyl chloride becomes insufficient, while when it Is less than 18 mN/rn satellites are frequently formed during ink ejection or the state of jetted ink droplets becomes unstable.

In the present invention, surface tension of ink refers to the static surface tension value determined at 25° C. Its measurement methods are described in common references of surface chemistry and colloidal chemistry. It is possible to employ the measurement methods described, for example, on pages 68-117 of Shin Jikken Kagaku Koza, Dai 18 Kan (Kaimen to Colloid), (Lecture on New Experimental Chemistry, volume 18 (Surface and Colloid)), edited by Nihon Kagaku Kai, published by Maruzen Co., Ltd. In practice, it is possible to determine surface tension employing a ring method (being the du Nouy method, and a platinum plate method (being the Wilhelmy method). In the present invention, the surface tension is represented by the surface tension value (mN/m) determined by the platinum plate method. Listed as its measurement instrument is SURFACE TENSIOMETER CBVP-Z, produced by Kyowa Interface Science Co., Ltd.

Cited as a method to regulate the surface tension of ink is one in which solvents of a low surface tension and surface active agents are added. In the present invention, it is preferable to employ surface active agents. By regulating the surface tension by the addition of the surface active agents, wettability of ink when printed onto polyvinyl chloride and retardation of bleed-through when recorded onto paper substrate media tend to be compatible. It is possible to employ, as a surface active agent, various ones such as anionic surface active agents, nonionic surface active agents, cationic surface active agents, or amphoteric surface active agents, and it is particularly preferable to employ fluorine based or silicone based surface active agents.

Examples of fluorine based surface active agents include SURFLON S-111N, S-113, S-121, S-131, S-132, S-141, S-145, S-381, S-383, S-393, SC-101, KH-40, and SA-100 (all produced by Seimi Chemical Co., Ltd.); MEGAFACE F-114, F-410, F-411, F-450, F-493, F-494, F-443, F-444, F-445, F-446, F-470, F-471, F-474, F-475, F-477, F-478, F 479, F-480SF, F-482, F-483, F-484, F-486, F-487, F-172D, F-178K, F-178RM, ESM-1, MCF-350SF, BL-20, R-61, and R-90 (all produced by Dainippon Ink and Chemicals, Inc.); FLUORAD FC-93, FC-95, FC-98, and FC-29 (all produced by Sumitomo 3M Ltd.); UNIDYNE DS-101, DS-102, and DS-202 (all produced by Daikin Industries, Ltd.); EFTOP EF-102, 103, 104, 105, 112, 123A, 123B, 132, 306A, 501, 201, and 204 (all produced by Tohkem Products Corp.); and FTERGENT F-100, 150, and 300 (all produced by NEOS Corp.). Examples of silicone based surface active agents include BYK-307, 330, 333, 345, 346, 347, 348, 375, and 377 (all produced by BYK-Chemie Japan KK).

The ink-jet ink of the present invention is characterized in incorporating, as a colorant, pigments which correspond to Component (C). By employing pigments, it is possible to enhance the weather resistance of recordings recorded on polyvinyl chloride.

Employed as pigments usable in the present invention are those known in the art without any particular limitation, and it is possible to employ any water dispersion pigment and solvent dispersion pigment. For example, preferably employed may be organic pigments such as insoluble pigments or lake pigments as well as inorganic pigments such as carbon black.

Insoluble pigments are not particularly limited and preferred examples include azo, azomethine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

Specific pigments, which are preferably usable, include the following.

Listed as magenta or red pigments are, for example, C.I. Pigment Red 2, C.I. Pigment Red 3, C.I. Pigment Red 5, C.I. Pigment Red 6, C.I. Pigment Red 7, C.I. Pigment Red 12, C.I. Pigment Red 15, C.I. Pigment Red 16, C.I. Pigment Red 48 (Ca), C.I. Pigment Red 48 (Mn), C.I. Pigment Red 48:1, C.I. Pigment Red 53:1, C.I. Pigment Red 57 (Ca), C.I. Pigment Red 57:1, C.I. Pigment Red 112, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 184, C.I. Pigment Red 202, C.I. Pigment Red 209, C.I. Pigment Red 222, C.I. Pigment Red 254, and C.I. Pigment Violet 19.

Listed as pigments for orange or yellow are, for example, C.I. Pigment Orange 31, C.I. Pigment Orange 43, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 18S, C.I. Pigment Yellow 213 and C.I. Pigment Yellow 214.

Listed as pigments for green or cyan are, for example, C.I. Pigment Blue 1, C.I. Pigment Blue 2, C.I. Pigment Blue 3, C.I. Pigment Blue 15, C.I. Pigment Blue 15:2, C.I. Pigment Green 15:3, C.I. Pigment Blue 15:4, C.I. Pigment Blue 16, C.I. Pigment Blue 22, C.I. Pigment Blue 60 and C.I. Pigment Green 7.

Other than the above, when green, blue, and intermediate colors are necessitated, it is preferable to employ the following pigments individually or in combination, examples of which include:

C.I. Pigment Red 209, 224, 177, and 194,
C.I. Pigment Orange 43,
C.I. Vat Violet 3,
C.I. Pigment Violet 19, 23, and 37,
C.I. Pigment Green 36 and 8, and
C.I. Pigment Blue 15:6.

Further, listed as pigments for black are, for example, C.I. Pigment Black 1, C.I. Pigment Black 6, and C.I. Pigment Black 7.

It is preferable to regulate the content of these pigments in ink to 2-10% by weight. Further, in order to reduce the feel of grain of images, pale ink is occasionally employed. In such a case, it is preferable to regulate the content of pigments of the pale ink with respect to dark ink to be 1/5-1/2.

It is preferable that pigments used in the present invention are dispersed, employing a homogenizer, together with dispersing agents and necessary other addenda in response to various targeted purposes and then employed. Employed as such a homogenizer may be a ball mill, a sand mill, an attritor, a roller mill, an agitator, a HENSCHEL mill, a colloid mill, an ultrasonic homogenizer, a pearl mill, a wet system jet mill, or a paint shaker, each of which is known in the art.

The average diameter of particles of a pigment dispersion employed in the ink of the present invention is preferably 10-200 nm, but is more preferably 50-150 nm. By regulating the average particle diameter to at least 10 nm, coagulation among pigment particles is hardly formed. On the other hand, by regulating the average particle diameter to at most 200 nm, it becomes easier to retard pigment sedimentation during extended storage. By regulating the average particle diameter within the above range, it becomes easier to obtain an ink exhibiting the desired storage stability.

It is possible to determine the diameter of particles in a pigment dispersion by employing commercial particle size meters based on a light scattering method, an electrophoretic method, or a laser Doppler method. Further, it is possible to determine the diameter in such a manner that images of at least 100 particles are captured by a transmission type electron microscope, and the resulting images are subjected to a statistical treatment employing image analysis software such as IMAGE-PRO (produced by Media Cybernetics).

Employed as pigment dispersing agents are surface active agents and polymer dispersing agents, and polymer dispersing agents are more preferred. Listed as polymer dispersing agents may be (meth)acryl based resins, styrene-(meth)acryl based resins, hydroxyl group-incorporating carboxylates, salts of long chain polyamide with high molecular weight acid ester, salts of high molecular weight polycarboxylic acid, salts of long chain polyaminoamide with polar acid ester, high molecular weight unsaturated acid ester, modified polyurethane, modified polyacrylate, polyether ester type anionic surface active agents, naphthalenesulfonic acid formalin condensation product salts, aromatic sulfonic acid formalin condensation product salts, polyoxyethylene alkyl phosphates, polyoxyethylene nonyl phenyl ether, stearylamine acetate, and pigment derivatives.

Specific examples include JOHNCRYL (produced by Johnson Polymer Co.), ANTI-TERRA-U (produced by BYK Chemie Co.), DISPERBYK (produced by BYK Chemie Co.), EFKA (produced by Efka Chemicals Co.), FLORENE (Kyoueisha Chemical Co., Ltd.), DISPARON (Kusumoto Chemical, Ltd.), AJISUPER (produced by Ajinomoto Fine Techno Co.), DEMOL (produced by Kao Corp.), HOMOGENOL (produced by Kao Corp.), EMULGEN (produced by Kao Corp.), SOLSPERSE (produced by Avicia Ltd.), and NIKKOL (produced by Nikko Chemicals Co., Ltd.).

The content of dispersing agents in ink is preferably 10-200% by weight with respect to the pigments. By regulating the content to at least 10% by weight, stability of pigment dispersion is enhanced, while by regulating the same to at most 200% by weight, ink ejection from ink-jet heads is readily stabilized.

In order to enhance fixability when printed onto polyvinyl chloride, various resins may be incorporated on the ink-jet ink of the present invention. Added resins include acryl based resins, polyester based resins, polyurethane based resins, vinyl chloride based resins, and vinyl chloride-vinyl acetate copolymer resins. These resins may be employed in a dissolved state or in the form of minute particles in the ink. When employed in the form of resin particles, the average particle diameter is preferably 10-300 nm.

Specific examples include acryl based resins such as JOHNCRYL (produced by Johnson Polymer Co.), ESLEX P (produced by Sekisui Chemical Co., Ltd.); polyester based resins such as ELITEL (produced by UNITIKA Ltd.) or BAIRON (TOYOBO Co., Ltd.); polyurethane resins such as BAIRON UR (produced by TOYOBO Co., Ltd.), NT-HI- LAMIC (produced by Dainichiseika Colour & Chemicals Mfg. Co. Ltd.), KURISUBON (produced by Dainippon Ink and Chemicals, Inc.), or NIPPORAN (produced by Nippon Polyurethane Industry Co., Ltd.); and vinyl chloride based resins such as SOLBIN (produced by Nissin Chemical Industry Co., Ltd.), VINYBRAN (produced by Nissin Chemical Industry Co., Ltd.), SARANLATEX (produced by Asahi Kasei Chemicals Co.), SUMIELITE (produced by Sumitomo Chemical Co., Ltd.), SEKISUI PVC (produced by Sekisui Chemical Co., Ltd.), and UCAR (produced by Dow Chemical Co.).

The content of these resins in ink is preferably 1-10% by weight. By regulating the content to at least 1% by weight, weather resistance of images recorded on polyvinyl chloride is enhanced, while by regulating the content to at most 10% by weight, ink ejection from ink-jet heads is readily stabilized.

Other than those described above, in response to purposes to enhance ejection stability, applicability to printing heads and ink cartridges, image retaining properties, and the various other performances, if desired, it is possible to incorporate, into the ink-jet ink of the present invention, various selected additives known in the art, such as viscosity controlling agents, resistivity controlling agents, film forming agents, UV absorbers, antioxidants, antifading agents, antifungal agents, or anticorrosive agents.

When images are formed via ejection of the ink-jet ink of the present invention, either an on-demand system or a continuous system may be employed in the ink-jet heads. Further, employed as an ejection system may be any of the electric-mechanical conversion systems (for example, a single cavity type, a double cavity type, a vendor type, a piston type, a shared-mode type, and a shared-wall type), and electric-thermal conversion systems (for example, a thermal ink-jet type, or a BUBBLE JET (being a registered trade mark) type.

In the image forming method employing the ink-jet ink of the present invention, ink-jet recording images are produced in such a manner that ink is ejected from the ink-jet heads based on digital signals employing a printer loaded with the ink-jet ink, and is subjected to adhesion onto a recording medium. In order to quickly and securely dry the ink adhered onto the recording medium, a method is preferred in which images are formed by elevating the surface temperature of the recording media. The surface temperature is regulated depending on the durability of the recording media and drying properties of employed ink, and is preferably 40-100° C. Specifically, when polyvinyl chloride is employed as a recording medium, by elevating the surface temperature, wettability of ink on the surface of the recording medium is enhanced. Consequently, it is more preferable that recording is carried out after elevating the surface temperature. Since wettability and ink drying properties may vary depending on brands of polyvinyl chloride recording media, the surface temperature may be regulated depending on characteristics of each brand of recording medium. Further, when recorded on recording media composed of a paper substrate, excessively high surface temperature occasionally results in curling and cockling. In such a case, it is preferable that the surface temperature may be regulated to a relatively low value, or recording is carried out at room temperature without any regulation of the surface temperature.

When recording is carried out after elevating the surface temperature of recording media, it is preferable that a heater is installed in the ink-jet recording apparatus. By heating recording media prior to or during conveyance, it is possible to regulate the surface temperature of recording media employing a single unit of an ink-jet recording apparatus.

It is preferable to employ polyvinyl chloride as a recording medium which is employed for ink-jet image recording in the present invention. Specific examples of recording media composed of polyvinyl chloride include SOL-371G, SOL-373M, and SOL-4701 (all produced by VIGteQnos Co.), KOTAKU EMBI (produced by System Graphi Co., Ltd.), KSM-VS, KSM-VST, and KSM-VT (all produced by Kimoto Co., Ltd.), J-CAL-HGX, J-CAL-YHG, and J-CAL-WWWG (all produced by Kyosho Osaka Co., Ltd.), BUS MARK V400 F VINYL and LITECAL V-600F VINYL (both produced by Flexcon Co.), FR2 (produced by Hanwha Co.), LLBAU 13713 and LLSP 20133 (both produced by Sakurai Co., Ltd.), P-370B and P-400M (both produced by KANBO PRASS Corp.), S02P, S12P, S13P, S14P, S22P, S24P, S34P, and S27P (all produced by Grafityp Co.), P-223RW, P-224RW, P-249ZW, and P-284ZC (all produced by Lintec Corp.), LKG-19, LPA-70, LPE-248, LPM-45, LTG-11, and LTG-21 (all produced by Shinseisha Co., Ltd.), MPI3023 (produced by Toyo Corp.), NAPOLEON GLOSS KOTAKU ENBI (produced by Niki Electronics Co.), JV-610 and Y-114 (both produced by IKC Co., Ltd.), NIJ-CAPVC and NIJ-SPVCGT (both produced by NITIE Corp., 3101/h12/P4, 3104/H12/P4, 3104/H12/P4s, 9800/H12/P4, 3100/H12/R2, 3101/H12/R2, 3104/H12/R2, 1445/14/P3, and 1438/ONE WAY VISION (all produced by Intercoat Co.), JT5129PM, JTS728P, JT5822P, JT5829P, JT5829R, JT5829PM, JT5829RM, and JT5929PM (all produced by Mactac Co.), MPI1005, MPI1900, MPI2001, MPI12002, MPI3000, MPI3021, MPI3500, and MPI3501 (all produced by Avery Co.), AM-101G and AM-501G (both produced by GIN-ICHI Corp.), FR2 (HANWHA Japan Co., Ltd.), AY-15P, AY-60P, AY-80P, DBSP137GGH, and DBSP137GGL (both produced by Insight Co., Ltd.), SJT-V200F and SJT-V400F (both produced by HIRAOKA & Co., Ltd.), SPS-98, SPSM-98, SPSH-98, SVGL-137, SVGS-137, ND3-200, MD3-301, MD5-100, and ND5-101M, MD5-105 (all produced by Metamark Co.), 640M, 641G, 3105M, 3105SG, 3162G, 3164G, 3164M, 3164XG, 3164XM, 3165G, 3165SG, 3165M, 3169M, 3451SG, 3552G, 3551M, 3631, 3641M, 3651G, 3651M, 3651SG, 3951G, and 3641M (all produced by Orafol Co.), SVTL-HQ130 (produced by Rami Corp.), SP300, GWF, and SPCLEARAD VINYL (all produced by Catalina Co.), RM-SJR (produced by Ryoyoshoji Co., Ltd.), HI LUCKY and NEW LUCKY PVC (both produced by LG Co.), SIY-110, SIY-310, and SIY-320 (all produced by Sekisui Chemical Industry Co., Ltd.), PRINT MI FRONTLIT and PRINT XL LIGHT WEIGHT BANNER (both produced by Endutex Co.), RIJET 100, RIJET 145, and RIJET 165 (all produced by Ritrama Co.), NM-SG and NM-SM (both produced by NICHIEIKAKO Co., Ltd.), LTO3GX (produced by Rukio Co., Ltd.), EASY PRINT 80 and PERFORMANCE PRINT 80 (both produced by Jetgraph Co., Ltd.), DSE 550, DSB 550, DSE 800G, DSE 802/137, V250WG, V300WG, and V350WG (all produced by Hexis Co.), and DIGITAL WHITE 6005PE and 601GPE (both produced by Multifix Co.).

The ink-jet ink of the present invention exhibits ink-jet recording capability for polyvinyl chloride and may be applied to recording on other media. Examples of recording media other than polyvinyl chloride include plain paper, coated paper, cast coated paper, glossy paper, glossy film, and OHP film. Specifically, compared to the polyvinyl chloride recording ink (being a so-called solvent ink) known in the art, the ink-jet ink of the present invention exhibit advantages in which when recording is carried out on a paper substrate carrying media such as plain paper or coated paper, rear surface penetration (or bleed-through) is minimized, and thus exhibits suitability for paper substrate carrying media.

EXAMPLES

The present invention will now be specifically described with reference to examples, however the present invention is not limited thereto. In the examples, "parts" or "%" is employed and represents "parts by weight" or "% by weight", respectively, unless otherwise specified.

<<Preparation of Ink>>

(Preparation of Ink 1)

<Preparation of Pigment Dispersion 1>

Twenty parts of Pigment Yellow 150, 10 parts of DISPER-BYK-184 (produced by Big Chemie Japan Co.) as a pigment dispersing agent, 30 parts of pure water, and 30 parts of 1,3-dimethyl-2-imidazolidinone were blended and the resulting mixture was dispersed employing a horizontal bead mill (being SYSTEM ZETA MINI, produced by Ashizawa Co.) loaded with 0.5 mm diameter zirconia beads at a volume ratio of 60%. Thereafter, the zirconia beads were removed, whereby Pigment Dispersion 2 was obtained.

<Preparation of Ink>

Above Pigment Dispersion 1, 1,3-dimethyl-2-imidazolidinone, diethylene glycol diethyl ether, ethylene glycol diacetate, pure water, and fixing resin BIRON UR8300 (produced by TOYOBO Co., Ltd.) were blended to attain the amounts described in Table 1, and subsequently, silicone based surface active agent BYK-247 (produced by BYK-Chemie Japan Co.) was added to the resulting mixture so that the surface tension reached 18 mN/m. The resulting ink was filtered through a 0.8 μm filter, whereby Ink 1 was obtained.

(Preparation of Inks 2-24)

Inks 2-24 were prepared in the same manner as above Ink 1, except that the composition of each additive was changed as described in Table 1.

(Preparation of Ink 25)

<Preparation of Pigment Dispersion 25>

Twenty parts of Pigment Yellow 150, 10 parts of DISPER-BYK-161 (produced by Big Chemie Japan Co.) as a pigment dispersing agent, 20 parts of γ-butyrolactone, and 50 parts of ethylene glycol diethyl ether were blended and the resulting mixture was dispersed employing a horizontal bead mill (being a SYSTEM ZETA MINI, produced by Ashizawa Co.) loaded with 0.5 mm diameter zirconia beads at a volume ratio of 60%. Thereafter, the zirconia beads were removed, whereby Pigment Dispersion 25 was obtained.

<Preparation of Ink>

Above Pigment Dispersion 25, γ-butyrolactone, diethylene glycol diethyl ether, fixing resin BIRON UR8300 (produced by TOYOBO Co., Ltd.) were blended to attain the amounts described in Table 1, and subsequently, the resulting mixture was filtered through a 0.8 μm filter, whereby Ink 25, which was the solvent ink, known in the art, was obtained.

(Preparation of Ink 26)

<Preparation of Pigment Dispersion 26>

Twenty parts of Pigment Yellow 150, 10 parts of SOL-SPERSE 20000 (produced by Avicia Co.), 20 parts of diethylene glycol, and 50 parts of pure water were blended and the resulting mixture was dispersed employing a horizontal bead mill (being a SYSTEM ZETA MINI, produced by Ashizawa Co.) loaded with 0.5 mm diameter zirconia beads at a volume ratio of 60%. Thereafter, the zirconia beads were removed, whereby Pigment Dispersion 26 was obtained.

<Preparation of Ink>

Above Pigment Dispersion 26, glycerin, diethylene glycol monomethyl ether, pure water, and minute fixing resin particles JOHNCRYL 450 (produced by Johnson Polymer Co.) were blended to attain the amounts described in Table 1, and subsequently, the resulting mixture was filtered through a 0.8 μm filter, whereby Ink 26, which was the aqueous ink known in the art, was obtained.

Table 1 shows the composition of each ink prepared as above. The value of each additive in Table 1 represents % by weight in the ink.

TABLE 1

| Ink No. | Component (A) | | Wetting Solvent | | | Solvent | | | Water | *1 | *2 | Pigment Type | *3 | *4 | Surface Tension mN/m | Remarks |
|---|---|---|---|---|---|---|---|---|---|---|---|---|---|---|---|---|
| | DMI | BTR | Gly | DEG | EtHDO | DEGDEE | EGDAc | DPGME | | | | | | | | |
| 1 | 30 | — | — | — | — | 15 | 15 | — | 28 | 6 | 2 | PY150 | 4 | Si | 18 | Inv. |
| 2 | — | 30 | — | — | — | — | 25 | — | 33 | 6 | 2 | PB15:3 | 4 | F | 25 | Inv. |
| 3 | 35 | — | — | — | — | — | 20 | 14 | 19 | 6 | 2 | PY150 | 4 | Si | 20 | Inv. |
| 4 | 40 | — | — | — | — | 38 | — | — | 10 | 6 | 2 | PR122 | 4 | Si | 25 | Inv. |
| 5 | 40 | — | 5 | — | — | — | — | 2 | 41 | 6 | 2 | PR122 | 4 | F | 21 | Inv. |
| 6 | — | 38 | — | — | — | — | — | — | 50 | 6 | 2 | PY150 | 4 | Si | 20 | Inv. |
| 7 | 42 | — | — | — | — | 10 | — | 6 | 30 | 6 | 2 | PY150 | 4 | Si | 23 | Inv. |
| 8 | 58 | — | — | — | — | — | — | — | 30 | 6 | 2 | PB15:3 | 4 | F | 22 | Inv. |
| 9 | 36 | — | 3 | — | — | — | 10 | 10 | 29 | 6 | 2 | CB | 4 | F | 22 | Inv. |
| 10 | 20 | — | — | — | 2 | 10 | 25 | — | 31 | 6 | 2 | PY150 | 4 | Si | 22 | Inv. |
| 11 | 30 | — | 3 | 3 | — | 22 | — | — | 30 | 6 | 2 | PB15:3 | 4 | F | 22 | Inv. |
| 12 | 30 | — | — | — | — | 28 | — | — | 30 | 6 | 2 | PY150 | 4 | F | 22 | Inv. |
| 13 | 27 | — | — | — | — | 30 | 6 | — | 25 | 6 | 2 | PR122 | 4 | Si | 24 | Inv. |
| 14 | 38 | — | — | — | — | 15 | — | — | 35 | 6 | 2 | PB15:3 | 4 | Si | 20 | Inv. |
| 15 | 25 | — | — | — | — | 30 | — | 10 | 23 | 6 | 2 | CB | 4 | F | 25 | Inv. |
| 16 | 30 | — | — | — | — | 5 | 10 | 5 | 38 | 6 | 2 | PR122 | 4 | Si | 17 | Comp. |
| 17 | 30 | — | — | — | — | 28 | — | — | 30 | 6 | 2 | CB | 4 | Si | 28 | Comp. |
| 18 | 36 | — | — | — | — | — | — | — | 52 | 6 | 2 | CB | 4 | F | 20 | Comp. |
| 19 | 19 | — | — | — | — | — | — | 39 | 30 | 6 | 2 | CB | 4 | Si | 22 | Comp. |

TABLE 1-continued

| Ink No. | Component (A) DMI | Component (A) BTR | Wetting Solvent Gly | Wetting Solvent DEG | Wetting Solvent EtHDO | Solvent DEGDEE | Solvent EGDAc | Solvent DPGME | Water | *1 | *2 | Pigment Type | *3 | *4 | Surface Tension mN/m | Remarks |
|---|---|---|---|---|---|---|---|---|---|---|---|---|---|---|---|---|
| 20 | 30 | — | — | — | — | — | 50 | — | 8 | 6 | 2 | PB15:3 | 4 | F | 25 | Comp. |
| 21 | 61 | — | — | — | — | — | 5 | 2 | 20 | 6 | 2 | PR122 | 4 | F | 22 | Comp. |
| 22 | 45 | — | 10 | — | — | — | — | — | 33 | 6 | 2 | PR122 | 4 | Si | 22 | Comp. |
| 23 | 20 | — | — | 5 | — | 8 | — | 10 | 45 | 6 | 2 | CB | 4 | Si | 22 | Comp. |
| 24 | 30 | — | — | — | 8 | 10 | 10 | — | 30 | 6 | 2 | PY150 | 4 | F | 22 | Comp. |
| 25 | — | 15 | — | — | — | 73 | — | — | — | 6 | 2 | PY150 | 4 | — | 28 | Comp. |
| 26 | — | — | 10 | 10 | — | — | — | 10 | 58 | 6 | 2 | PY150 | 4 | Si | 30 | Comp. |

*1: Fixing Resin,
*2: Dispersing Agent,
*3: Added Amount,
*4: Surface Active Agent
Inv.: Present Invention,
Comp.: Comparative Example Each of the additives abbreviated in above Table 1 will now be detailed.

(Component (A))
DMI: 1,3-dimethyl-2-imidazolidinone
BTR: γ-butyrolactone (Wetting Agent)
Gly: glycerin
DEG: diethylene glycol
EtHDO: 2-ethyl-1,3-hexanediol (Solvents)
DEGDEE: diethylene glycol diethyl ether
EGDA: ethylene glycol diacetate
DPGME: dipropylene glycol methyl ether (Pigments)
PY150: C.I. Pigment Yellow 150
PR122: C.I. Pigment Red 122
PB15:3: C.I. Pigment Blue
CB: carbon black (Surface Active Agent)
Si: silicone based surface active agent BYK-347 (produced by Big Chemie Japan Co.)
F: fluorine based surface active agent SURFLON S-393 (produced by Seimi Chemical Co.)

(Measurement of Surface Tension)
Surface tension (mN/m) of ink at 25° C. was determined employing surface tensiometer CBVP-Z, produced by Kyowa Interface Science Co., Ltd.

<<Evaluation of Ink Characteristics>>

(Evaluation of Ejection Stability)
The jetting state of ink droplets was monitored employing a piezo type head of a nozzle aperture of 28 mm, a driving frequency of 15 kHz, 512 nozzles, a minimum droplet volume of 12 pl, and a nozzle density of 180 dpi (dpi represents the number of dots per 2.54 cm), as well as employing a CCD camera of the electronic flash system jetted ink observing device, described in FIG. 2 of JP-A No. 2002-363469, while synchronizing the ejection cycle with the light emission cycle. Performance evaluated as B or better was considered to be commercially viable.
   A: ink droplets were ejected normally, and neither declined ejection nor any fluctuation in the rate was noticed
   B: though ink droplets were ejected, satellites were generated and the rate fluctuated
   C: ink droplets were not ejected normally, and nozzles were noticed in which the ink droplet rate was decreased or no ink droplets were ejected (as nozzle clogging)

(Evaluation of Unpleasant Odor Resistance)
Each of Inks 1-26 was applied onto JT5929PM (produced by Maetac Co.) which was a polyvinyl recording medium, employing a No. 10 wire bar Subsequently, any unpleasant odor of the resulting coating was evaluated based on the following criteria. Performance evaluated as B or better was considered to be commercially viable.
   A: hardly any unpleasant odor was sensed
   B: some unpleasant odor was sensed
   C: an unpleasant odor was obvious <<Evaluation of Formed Images>>
Each ink was loaded into an on-demand type ink-jet printer fitted with a piezo type head of a nozzle aperture of 28 μm, a driving frequency of 15 kHz, 512 nozzles, a minimum droplet volume of 12 pl, and a nozzle density of 180 dpi, as well as a heater of a maximum recording density of 1,440×1440 dpi. Subsequently, a 10 cm×10 cm solid image was recorded on P-224RW (produced by Lintec Co.), which is a polyvinyl chloride recording medium, via ejection of each ink. Further, during printing, heater temperature was set so that the surface temperature of the recording medium was maintained at 60° C. by heating the reverse side of the recording medium. The surface temperature of recording media was determined employing a non contact thermometer (TYPE IT-530N, produced by Horiba, Ltd.). Further, after returning the temperature of the recording media conveying section of the ink-jet printer to room temperature, a 5 cm×5 cm solid image was recorded on business class plain paper, produced by Konica Minolta Business Technology, Inc. Recording on the plain paper was carried out at room temperature without heating.

(Evaluation of Images)
Each image, which was prepared employing each of Inks 1-26 based on the above method, was evaluated based on the following method. Performance evaluated as B or better was considered to be commercially viable.

(Evaluation of Suitability for Polyvinyl Chloride)

<Evaluation of Suitability for Image Formation>
Each of the solid images recorded on polyvinyl chloride was visually observed and evaluated based on the following criteria.

A: a uniform solid image was formed
B: the solid image was nearly uniform, but exhibited partial mottling due to ink repellency during image recording
C: much mottling was exhibited due to ink repellency during image recording and the solid image was not uniform <Evaluation of Quick Drying>

After recording an image on polyvinyl chloride, the solid image was rubbed manually, and quick drying was evaluated based on the following criteria.
  AA: duration until no image was removed by rubbing with fingers was less than one minute after image recording
  A: duration until no image was removed by rubbing with fingers was 1-3 minutes after image recording
  B: duration until no image was removed by rubbing with fingers was 3-5 minutes after image recording
  C: duration until no image was removed by rubbing with fingers was at least 5 minutes after image recording <Evaluation of Glossiness>

Glossiness of a solid image recorded on polyvinyl chloride was visually observed and evaluated based on the following criteria.
  A: the image exhibited excellent glossiness
  B: the image exhibited sufficient glossiness
  C: the image exhibited haze and insufficient glossiness <Evaluation of Abrasion Resistance of Images>

An image recorded on polyvinyl chloride was rubbed with tissue paper and abrasion resistance of the image was evaluated based on the following criteria.
  A: image density exhibited no change after rubbing back-and-forth at least 50 times
  B: image density decreased within rubbing back-and-forth 20-50 times
  C: image density decreased within rubbing back-and-forth 20 times <Evaluation of Strength Resistance of Recording Medium>

The image portion recorded on polyvinyl chloride was horizontally pulled, the resulting feel was determined. The presence or absence of any decrease in strength of the image recorded portion was evaluated based on the following criteria.
  A: the feel did not differ from that of polyvinyl chloride on which no image was recorded and almost no decrease in strength resulted
  B: when pulled, the feel was soft and slight decrease in strength was noted
  C: when pulled, the feel was very soft, and when excessively pulled, the polyvinyl chloride medium was broken, exhibiting a decrease in strength (Evaluation of Suitability for Plain Paper)

<Evaluation of Rear Surface Penetration (or Bleed-Through) Resistance>

The front and reverse surfaces of the image recorded on plain paper were observed and bleed-through resistance was evaluated based on the following criteria.
  A: surface density was high and the reverse side was nearly white, exhibiting almost no bleed-through
  B: some bleed-through was noticed but the density of the front was clearly higher than that of the reverse
  C: bleed-through was significant, where the density of the front was almost same as the reverse Table 2 shows the results.

TABLE 2

| | Ink Characteristics | | Suitability for Polyvinyl Chloride | | | | | | |
|---|---|---|---|---|---|---|---|---|---|
| Ink No. | Ejection Stability | Unpleasant Odor Resistance | Image Formation | Quick Drying | Glossiness | Abrasion Resistance of Images | *1 | *2 | Remarks |
| 1 | B | A | A | AA | A | A | A | A | Inv. |
| 2 | A | A | B | AA | A | B | A | A | Inv. |
| 3 | A | B | A | AA | A | A | A | B | Inv. |
| 4 | A | B | A | AA | A | A | A | B | Inv. |
| 5 | A | A | A | B | A | A | A | A | Inv. |
| 6 | A | A | A | B | B | B | A | A | Inv. |
| 7 | A | A | A | AA | A | A | B | A | Inv. |
| 8 | A | A | A | AA | B | A | B | A | Inv. |
| 9 | A | A | A | A | A | A | A | A | Inv. |
| 10 | A | A | A | A | A | A | A | A | Inv. |
| 11 | A | A | A | B | A | A | A | A | Inv. |
| 12 | A | A | A | AA | A | A | A | A | Inv. |
| 13 | A | A | A | AA | A | A | A | A | Inv. |
| 14 | A | A | A | AA | A | A | A | A | Inv. |
| 15 | A | A | A | AA | A | A | A | A | Inv. |
| 16 | C | A | A | AA | A | A | A | A | Comp. |
| 17 | A | A | C | AA | A | A | A | A | Comp. |
| 18 | A | A | A | C | B | A | A | A | Comp. |
| 19 | A | A | A | C | A | B | A | A | Comp. |
| 20 | A | C | A | AA | A | A | A | C | Comp. |
| 21 | A | A | A | AA | A | A | C | A | Comp. |
| 22 | A | A | A | C | B | A | A | A | Comp. |
| 23 | A | A | A | C | A | A | A | A | Comp. |
| 24 | A | A | A | C | A | A | A | A | Comp. |
| 25 | A | C | A | A | A | B | A | C | Comp. |
| 26 | A | A | C | C | C | B | A | A | Comp. |

*1: Strength Resistance of Recording Medium,
*2: Suitability for Plain Paper Bleed-through Resistance As can clearly be seen from the results shown in Table 2, inks, which were composed as specified in the present invention, were superior to the comparative examples in all characteristics, namely ink ejection stability, unpleasant odor resistance, image forming suitability, quick drying, glossiness, image abrasion resistance and, strength resistance of the recording medium when images were recorded on polyvinyl chloride, and bleed-through resistance when printed on plain paper as a recording medium.

What is claimed is:

1. An ink-jet ink comprising Component (A), Component (B), and Component (C),
   wherein a content of Component (A) is 20-60% by weight, a content of Component (B) is 20-40% by weight, and the total content ratio of glycols, polyols, and glycerin is 0-20% by weight based on the content of Component (A), and a surface tension of the ink-jet ink is 18-25 mN/m;
   Component (A): 1,3-dimethyl-2-imidazolidinone or γ-butyrolactone,
   Component (B): water, and
   Component (C): a pigment.

2. The ink-jet ink of claim 1, further comprising a surface active agent.

3. The ink-jet ink of claim 2, wherein the surface active agent is a fluorine based surface active agent or a silicone based surface active agent.

4. The ink-jet ink of claim 1, wherein the total content ratio of glycols, polyols, and glycerin is 0-10% by weight based on the content of Component (A).

5. The ink-jet ink of claim 1, wherein the ink-jet ink contains no glycols and polyols, nor glycerin.

6. The ink-jet ink of claim 1, wherein the content of Component (A) is 20-40% by weight based on the total weight of the ink.

7. The ink-jet irk of claim 1, wherein Component (A) is 1,3-dimethyl-imidazolidinone.

8. The ink-jet ink of claim 1, incorporating at least one solvent selected from a group consisting of alkylene glycol monoalkyl ethers, alkylene glycol dialkyl ethers, alkylene glycol acetates, alkylene glycol diacetates, and alkylene glycol monoalkyl ether acetates.

9. The ink-jet ink of claim 1, incorporating at least one solvent having a boiling point of 180-250° C. and a surface tension of 20-30 in, selected from the group consisting of alkylene glycol monoalkyl ethers, alkylene glycol dialkyl ethers, alkylene glycol acetates, alkylene glycol diacetates, and alkylene glycol monoalkyl ether acetates.

10. A method for ink-jet recording comprising the step of:
    i) recording an image employing the ink-jet ink of claim 1, onto polyvinyl chloride as a recording medium.

11. A method for ink-jet recording comprising the step of:
    i) recording an image employing the ink-jet ink of claim 1 onto a paper substrate recording medium.

12. A method for ink-jet recording comprising the step of:
    i) recording an image employing the ink-jet ink of claim 1 onto a recording medium a surface temperature of which is controlled with a heater provided with a recording apparatus.

13. The method for ink-jet recording of claim 12, wherein the recording medium at a controlled surface temperature is polyvinyl chloride.

* * * * *